United States Patent [19]
Fahley

[11] Patent Number: 5,877,404
[45] Date of Patent: Mar. 2, 1999

[54] METHOD AND APPARATUS FOR CALIBRATING MAGNET/BACKIRON BONDING STATION

[75] Inventor: Terry R. Fahley, Lakeville, Minn.

[73] Assignee: Seagate Technology, Inc., Scotts Valley, Calif.

[21] Appl. No.: 984,379

[22] Filed: Dec. 3, 1997

[51] Int. Cl.⁶ .................................................. G01L 17/38
[52] U.S. Cl. .................................................. 73/1.81
[58] Field of Search .................................. 73/1.79, 1.81, 73/865.9; 29/603.01, 407.05; 360/105, 109; 156/378, 379

Primary Examiner—Robert Raevis
Attorney, Agent, or Firm—Westman, Champlin & Kelly, P.A.

[57] ABSTRACT

A method of calibrating a bonding station involves placing a first surface of calibration tool in contact with a fixed surface of a movable assembly. The position of an adjustable surface of the movable assembly is then changed so that the adjustable surface contacts a second surface of the calibration tool. In addition, a calibration tool for calibrating the bonding station is provided.

7 Claims, 10 Drawing Sheets

METHOD AND APPARATUS FOR CALIBRATING MAGNET/BACKIRON BONDING STATION

REFERENCE TO CO-PENDING APPLICATION

This application is related to two U.S. applications filed on even date herewith entitled METHOD AND APPARATUS FOR MAGNET/BACKIRON BONDING USING AIR CYLINDER, having attorney docket number S01.12-0383; and METHOD AND APPARATUS FOR MAGNET/ BACKIRON BONDING USING SLIP FIT PINS, having attorney docket number S01.12-0410. All three applications are owned by a common assignee.

FIELD OF THE INVENTION

The present invention relates to bonding stations used to bond magnets to backirons. In particular, the present invention relates to robust bonding stations that precisely position the magnet relative to a backiron during bonding.

BACKGROUND OF THE INVENTION

In optical, magneto-optical and magnetic disc drives used for data storage, an actuator arm positions read or write heads over the disc to acquire information from the disc or store information to the disc. Movement of the actuator arm is typically controlled by a magnetic motor that includes a conductive coil position between a magnetic assembly. Typically, the magnetic assembly consists of two magnetic pieces bonded to two respective backirons that are maintained a fixed distance apart so that the conductive coil can move between the magnets.

To ensure consistent and predictable actuator arm movement, each magnetic assembly must be constructed with extreme precision so that variations between magnetic assemblies are minimized. In particular, the magnets must be precisely positioned relative to their respective backirons so that the position of the conductive coil relative to the magnet is consistent in each disc drive.

This type of accuracy and consistency cannot be achieved without the use of bonding stations that clamp the backiron and the magnet in a desired spatial relationship during bonding.

Typically, bonding stations achieve the proper alignment between the magnetic assembly and the backiron by using a lateral actuator and a staggered back assembly. The lateral actuator carries a movable front assembly that engages the magnet and the backiron as it moves toward the staggered back assembly and thereby presses the magnet and the backiron toward the staggered back assembly.

The staggered surfaces of the back assembly produce the desired spatial relationship between the magnet and the backiron. In particular, the magnet and the backiron contact two separate surfaces on the back assembly. These two surfaces are staggered relative to one another such that the surface contacting the magnet is closer to the front assembly than the surface contacting the backiron.

The front assembly also includes two separate portions that individually contact the magnet and the backiron respectively. In particular a nylon pusher on the front assembly contacts and presses the magnet and two locating pins contact the backiron and force the backiron toward the back assembly.

In order to properly position the magnet on the backiron, it is important that the end of the nylon pusher that contacts the magnet is the proper lateral distance from the locating pins.

In prior art bonding stations, this distance is determined by measuring the distance between a surface of the front assembly facing away from the back assembly and a housing of the lateral actuator. The measurements are typically performed using "go" and "no-go" blocks. The "go" block must fit between the lateral actuator housing and the back surface of the front assembly while the "no-go" block must not fit in this space. To achieve the proper distance between the front assembly and the back assembly, the position of the front assembly on the lateral actuator arm was adjusted until the proper distance was achieved.

However, measuring the proper position for the front assembly based on the distance from the back surface of the front assembly to the housing of the actuator is undesirable since it does not directly measure the distance from the nylon pusher to the back assembly or the distance from the locating pins to the back assembly. By measuring the distance from the back surface of the front assembly to the actuator housing, the prior art does not take into account numerous tolerasce errors that occur because of variations in the size of the font assembly, and variations in the location of the actuator housing relative to the back assembly. As such, prior art calibration tools do not properly calibrate existing bonding stations.

The present invention provides a solution to this and other problems, and offers other advantages over the prior art.

SUMMARY OF THE INVENTION

A method of calibrating a bonding station involves placing a first surface of calibration tool in contact with a fixed surface of a movable assembly. The position of an adjustable surface of the movable assembly is then changed so that the adjustable surface contacts a second surface of the calibration tool.

In preferred embodiments, the first surface of the calibration tool is a precise distance from the second surface of the calibration tool.

Also, a calibration tool is provided that includes a first surface for contacting a fixed surface of a movable front assembly and a calibration surface positioned relative to the first surface such that the movable front assembly is calibrated when the adjustable surface is in contact with the calibration surface while the first surface is in contact with the fixed surface.

DETAILED DESCRIPTION OF THE PREFERRED EMBODIMENTS

Figure 1:
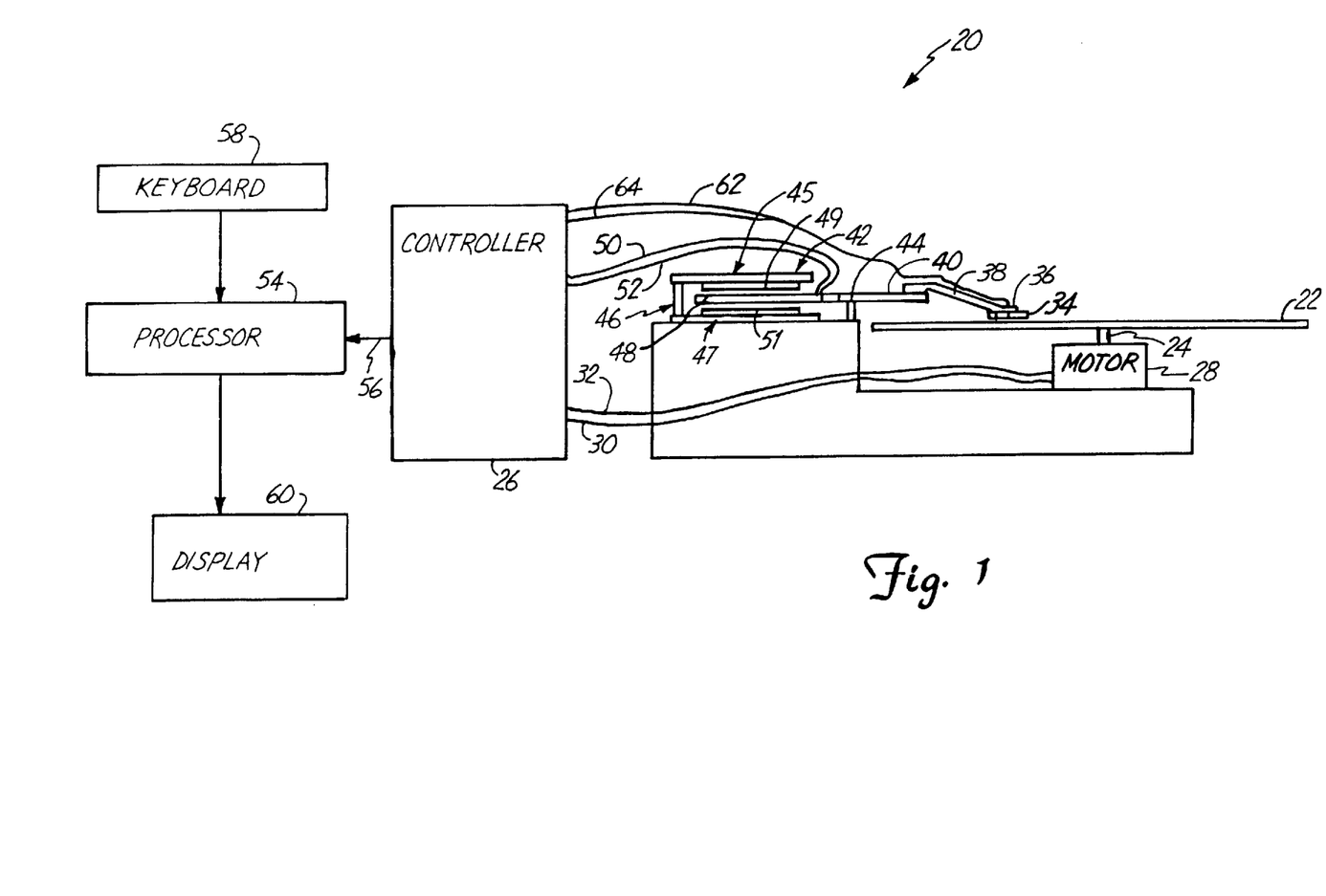
FIG. 1 is a combination side and block diagram of a disc drive storage system.

FIG. 1 is a combination block diagram and side view of a system 20 for retrieving and storing data on a disc. In system 20, a disc 22 spins about a spindle 24 under the control of controller 26 acting through motor 28. Controller 26 is connected to motor 28 through motor control lines 30 and 32.

The rotation of disc 22 causes a head 34 to lift off the surface of disc 22. Head 34 is positioned over the surface of disc 22 through a suspension assembly consisting of a gimbal 36, flexure arm 38, load beam 40 and actuator 42. The suspension assembly pivots about pivot point 44 causing head 34 to move in an arc over the surface of disc 22.

Actuator 42 includes magnetic assembly 46 and magnetic coil 48. Magnetic assembly 46 has two magnetic sub-assemblies 45 and 47, which have respective magnets 49 and 51. Magnetic coil 48 is formed on an actuator arm extending opposite of load beam 40 across pivot point 44. Conductors 50 and 52 are connected to magnetic coil 48 and to controller 26. Through conductors 50 and 52, controller 26 passes a current through magnetic coil 48 causing magnetic coil 48 to produce a magnetic field that interacts with the magnetic field generated by magnets 49 and 51 of magnetic assembly 46. This interaction causes suspension assembly 20 to pivot about pivot point 44 and thereby moves head 34 in an arc across disc 22. The position of the suspension assembly is such that head 34 may be positioned at any radial position along disc 22.

The desired speed for motor 28 and the desired location for head 34 is communicated through controller 26 by a processor 54 that communicates to controller 26 through a bi-directional bus 56. Processor 54 receives user input from keyboard 58 and produces perceivable output at display 60. Note that the blocks of FIG. 1 are not to scale.

Embedded in head 34 is a read sensor and possibly a write sensor. The read sensor produces or effects an electrical signal that is carried on conductor 62 and 64, which are connected to controller 26. Controller 26 conditions the signal carried on conductors 62 and 64 by, for example, converting the signal from analog to digital before passing the digitized signal along bi-directional bus 56 to processor 54.

Figure 2:
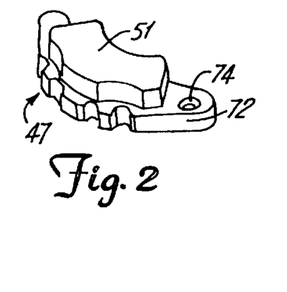
FIG. 2 is a perspective view of the magnetic sub-assembly of FIG. 1.

FIG. 2 is a perspective view of sub-assembly 47 of FIG. 1 that includes magnet 51 and backiron 72. Magnet 51 is bonded to backiron 72, preferably by an adhesive. Backiron 72 includes a centering aperture 74 used to position the backiron in a bonding station as described further below.

Figure 3:
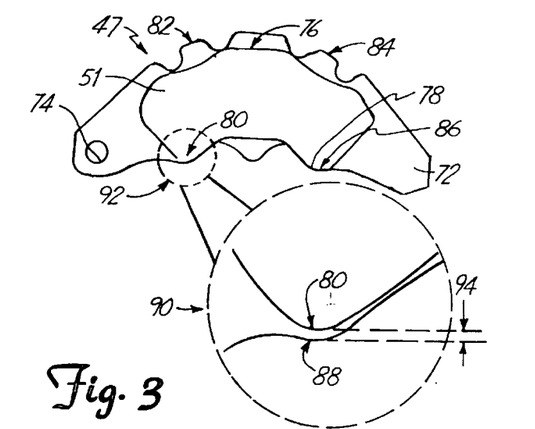
FIG. 3 is a top view of the magnetic subassembly of FIG. 2.

FIG. 3 is a top view of magnetic sub-assembly 47 of FIG. 2. Magnet 51 has a front datum-surface 76 and two back datum surfaces 78 and 80. Front datum surface 76 and back datum surfaces 78 and 80 are used to position magnet 70 in a bonding station as described further below. Backiron 72 includes front datum surfaces 82 and 84 and back datum surfaces 86 and 88. Front datum surfaces 82 and 84 and back datum surfaces 86 and 88 are used to position backiron 72 in a bonding station relative co magnet 51.

As shown in enlargement 90, which is an enlargement of area 92 of backiron 72 and magnet 51, back datum surface 80 of magnet 51 is separated from back datum surface 88 of backiron 72 by a distance 94. Although not shown in detail in FIG. 3, back datum surface 78 is similarly separated from back datum surface 88. Preferably, distance 94 is 0.005 inches (0.127 mm) plus or minus 0.001 inches (0.025 mm).

Figure 4:
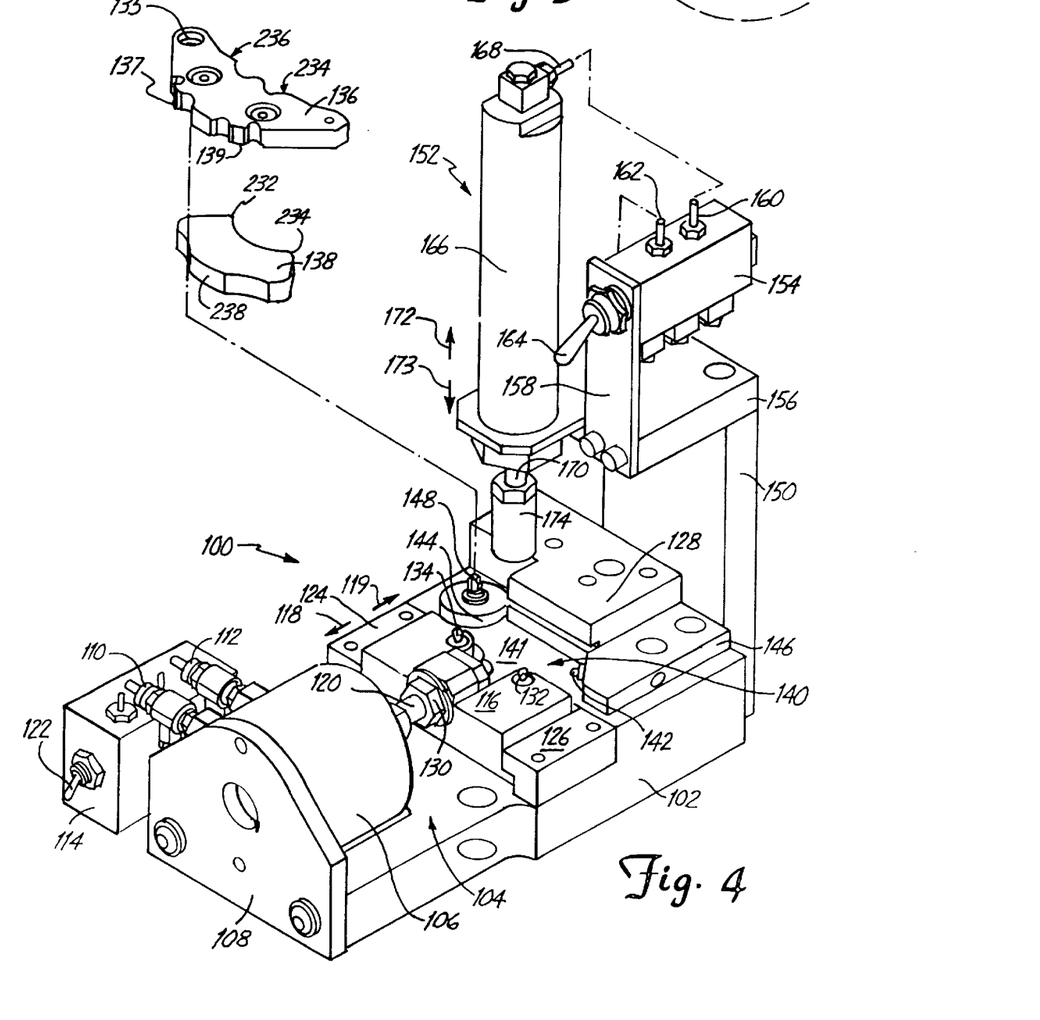
FIG. 4 is a perspective view of a bonding station in accordance with a preferred embodiment of the present invention.

To achieve this level of accuracy in positioning the magnet relative to the backiron, the present invention provides a bonding station 100 shown in FIG. 4. In FIG. 4, a magnet 138 and a backiron 136 are shown removed from the bonding station before bonding occurs. Backiron 136 includes aperture 135, front datum surfaces 137 and 139, and back datum surfaces and 143. Magnet 138 includes front datum surface 238 and back datum surfaces 232 and 234. During bonding, magnet 138 and backiron 136 are supported by a base surface 141 of a nest 140 in bonding station 100 and are restrained in the nest by a fluidly controlled lateral actuator 104 and a fluidly controlled vertical actuator 152.

Bonding station 100 includes a base 102, which supports lateral actuator 104 and vertical actuator 156. Lateral actuator 104 includes a cylinder housing 106 connected to base 102 through a clamp bracket 108. Cylinder housing 106 has two input ports 110 and 112 that are fluidly connected to a toggle valve 114. In preferred embodiments of the present invention, cylinder housing 106 is a pneumatic cylinder that moves a pin holder 116 in directions 118 and 119 by moving a clamp rod 120 extending between cylinder housing 106 and pin holder 116. Toggle valve 114 includes a toggle switch 122, which toggles between an up position and a down position. When toggle switch 122 is in a down position, a positive air pressure is applied through port 110, which forces clamp rod 120 to move pin holder 116 in direction 119. When toggle 122 is in an up position, a positive air pressure is applied through port 112 causing clamp rod 120 to move pin holder 116 in direction 118. Thus, lateral actuator 104 is a reversible actuator that can move pin holder 116 in opposite directions 118 and 119.

Pin holder 116 has its movement partially controlled by guides 124 and 126, which are bonded to base 102 and which have respective ledges extending over respective guide rails of pin holder 116. Pin holder 116 contains two apertures that are filled with respective locating pins 132 and 134. Locating pins 132 and 134 are used to position backiron 136 relative to magnet 138 as described further below.

During bonding, magnet 138 is inserted in nest 140, which is formed between pin holder 116, back assembly 128, plunger 142 and rolling sleeve 144. Magnet 138 is inserted into nest 140 while lateral actuator 104 is withdrawn. Toggle switch 122 is then toggled and lateral actuator 104 moves pin holder 116 toward back assembly 128. Depending on its placement within nest 140, magnet 138 may engage rollable sleeve 144 while lateral actuator 104 is moving magnet 138 toward back assembly 128. If this occurs, rollable sleeve 144 will guide magnet 138 toward plunger 142. As magnet 138 comes into contact with back assembly 128, a surface of the magnet will depress plunger 142, which is resiliently connected to a plunger holder 146.

At the center of rollable sleeve 144 is a diamond point 148, which with locating pins 132 and 134 positions backiron 136 above magnet 138. After an adhesive is applied to magnet 138, backiron 136 is pressed between back assembly 128 and locating pins 132 and 134 while locating hole 135 of backiron 138 is aligned with diamond point 148.

A vertical bracket 150 is connected to base 102 and supports vertical actuator 152 and a vertical toggle valve 154. Vertical toggle valve 154 is supported on bracket 150 by a horizontal bracket 156 and a toggle bracket 158. Toggle valve 154 has two output ports 160 and 162 that alternately carry a positive pressure depending on the state of a toggle switch 164 in toggle valve 154. When toggle switch 164 is down, positive pressure is carried by output port 160, and when toggle switch 164 is up, positive pressure is carried by output port 162.

Output ports 160 and 162 are fluidly connected to two respective input ports on vertical cylinder housing 166. For clarity, only the fluid connection between input port 160 and input port 168 is shown in FIG. 4. Vertical cylinder housing 166 is supported by horizontal bracket 156 and moves vertical clamp rod 170 in directions 172 and 173. For instance, when output port 160 has a positive pressure, vertical cylinder housing 166 causes vertical clamp rod 170 to move in direction 173. When output port 162 carries a positive pressure, vertical cylinder housing 166 causes vertical clamp rod 170 to move in direction 172. At the end of vertical clamp rod 170 is a pad 174 that reduces wear on backiron 130 and clamp rod 170 during bonding.

In preferred embodiments, a majority of the bonding station is constructed from either aluminum or stainless steel, which are both non-magnetic. However, to reduce wear on the bonding station, back assembly 128 and pin holder 132 may be made out of hardened steel, which is magnetic, as long as magnet 138 has not had its magnetic moments aligned to produce unified magnetic fields. Once magnet 138 is bonded to backiron 176, the magnet can be "charged" by exposing it to a strong magnetic field that aligns the magnetic moments of magnet 138.

Figure 5:
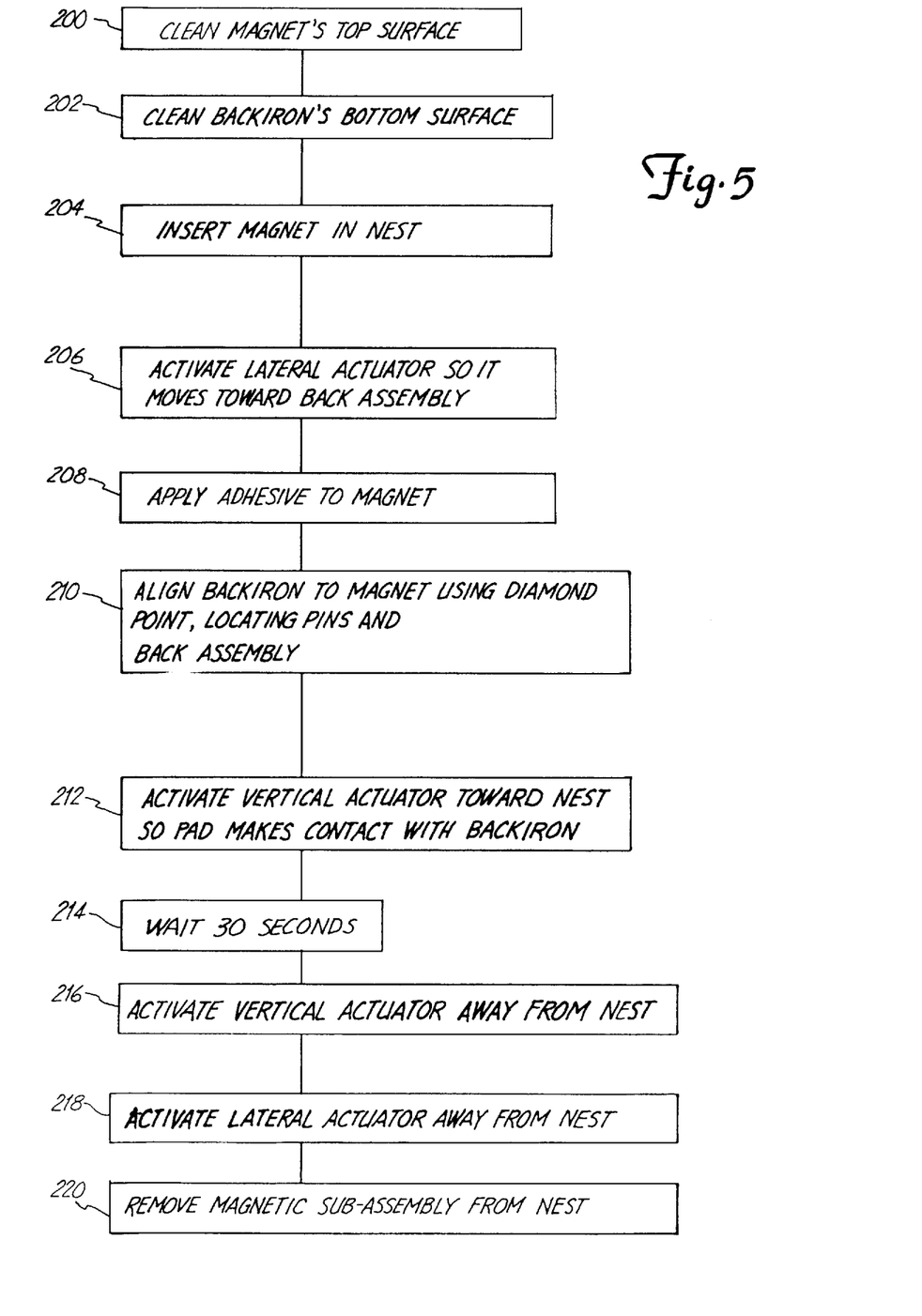
FIG. 5 is a flow diagram of a method of bonding a magnet to a backiron in accordance with a preferred embodiment of the present invention.

FIG. 5 is flow diagram of a method of bonding magnet 138 to backiron 136 using bonding station 100. First, the bonding surface of magnet 138 is cleaned in step 200. In a manufacturing setting, this step can be performed on a batch of magnets. In step 202, the bonding surface of backiron 136 is cleaned. This step can also be performed on a batch of backirons. Once the magnet and backiron have been cleaned, magnet 138 is inserted into nest 140 in step 204. At step 206, toggle switch 122 is toggled causing lateral actuator 104 to move pin holder 116 toward back assembly 128. When actuator 104 is fully extended, magnet 138 is properly positioned in nest 140.

A small amount of adhesive is applied to the bonding surface of magnet 138 in step 208. In step 210, backiron 136 is pressed into place over magnet 138 by aligning aperture 135 of backiron 136 with diamond point 148 while bringing back datum surfaces 234 and 236 of backiron 136 into contact with back assembly 128. Front datums 137 and 139 of backiron 136 are then pivoted downward to engage locating pins 132 and 134, which provide a horizontal clamping force to hold backiron 136 in position. Once backiron 136 is in position, toggle switch 163 is toggled downward in step 212 causing vertical cylinder 166 to move pad 174 on vertical clamp rod 170 into contact with backiron 136 such that the downward force presses backiron 136 into the adhesive and magnet 138.

In step 214, the operator waits 30 seconds for the adhesive to bond backiron 136 to magnet 138 before moving on to step 216 where toggle switch 164 is toggled upward causing vertical actuator 152 to move clamp rod 170 away from backiron 136. In step 218, lateral actuator 104 is activated by toggling toggle switch 122 to cause pin holder 116 to move away from nest 140. The completed magnetic sub-assembly is then removed in step 220.

Figure 6:
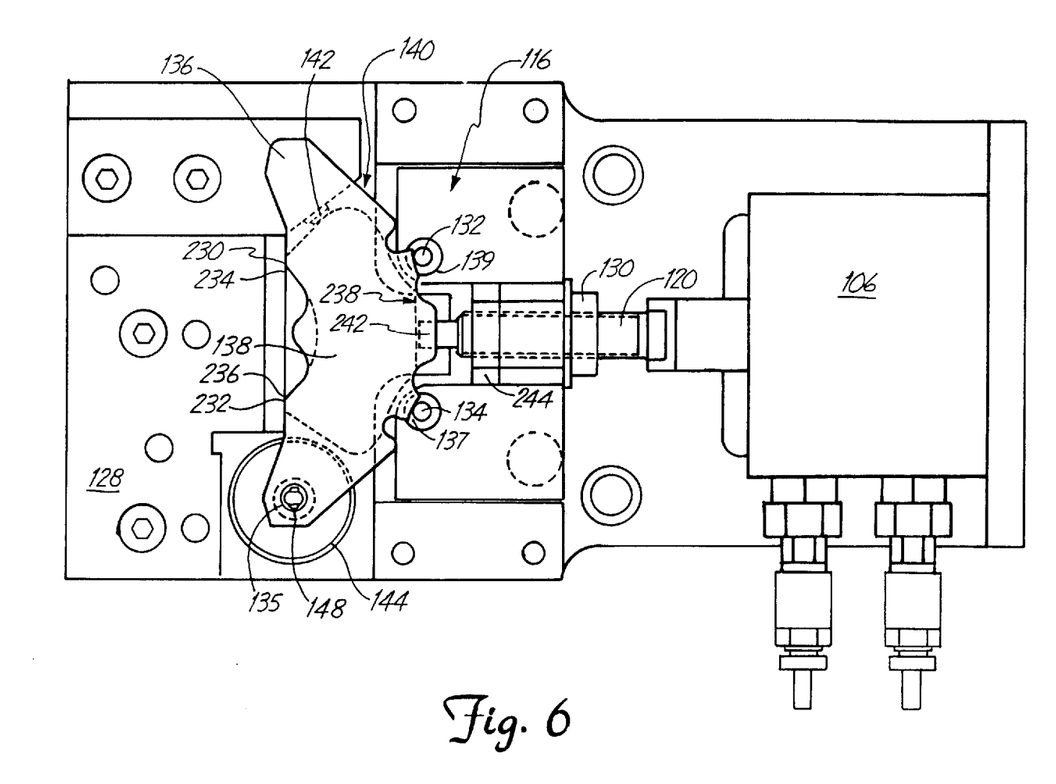
FIG. 6 is a top view of the bonding station of FIG. 4.

FIG. 6 is a top view of bonding station 100 of FIG. 4, with backiron 136 and magnet 138 shown in nest 140. A nylon pusher 242, connected to the end of clamp rod 120, presses against forward datum surface 238 of magnet 138, causing rear datum surfaces 230 and 232 of magnet 138 to contact a back surface of back assembly 128. Magnet 138 also contacts rollable sleeve 144, thereby causing it to depress plunger 142.

Aperture 135 of backiron 136 is centered about diamond point 148. Front datum surfaces 139 and 137 contact locating pins 132 and 134, respectively, which force rear datum surfaces 234 and 236 of backiron 136 into contact with a surface of back assembly 128. As is described below, locating pins 132 and 134 are connected to resilient members within a housing that permit locating pins 132 and 134 to flex in a lateral direction as backiron 136 is pressed toward magnet 138.

Clamp rod 120 is a threaded rod that threadably engages a jam nut 244 and a locking nut 130. With locking nut 130 loosened so that it is not in contact with pin holder 116, clamp rod 120 may be rotated about its long axis. Because of jam nut 244, this rotation will change the position of nylon pusher 242 relative to locating pins 132 and 134. With locking nut 130 tight against pin holder 116, clamp rod 120 cannot rotate.

Figure 7:
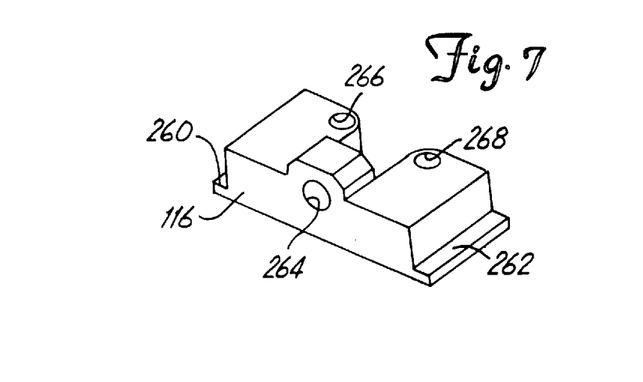
FIG. 7 is a perspective view of the pin holder of FIG. 4.

FIG. 7 is a perspective view of pin holder 116 of FIG. 4. Two guide rails 260 and 262 extend from the lower portion of pin holder 116 and provide guide surfaces that are restrained by guides 124 and 126 of FIG. 4. Pin holder 116 includes three apertures 264, 266, and 268. Aperture 264 accommodates a portion of lateral clamp rod 120, and apertures 266 and 268 receive locating pins 134 and 132 respectively.

Figure 8:
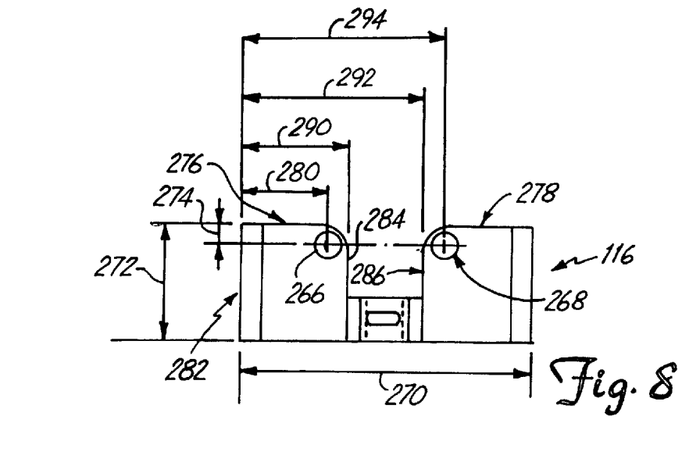
FIG. 8 is a top view of pin holder 116 of FIG. 7.

FIG. 8 is a top view of pin holder 116 of FIG. 7. Pin holder 116 has a width 270 and a length 272 that are equal to 2.75 inches (69.85 mm) and 1.156 inches (29.36 mm). The center of apertures 266 and 268 are located a distance 274 from leading surfaces 276 and 278, respectively, of pin holder 116. In preferred embodiments, distance 274 is equal to 0.188 inches (4.78 mm) plus or minus 0.001 inches (0.0254 mm). Preferably, apertures 266 and 268 each have a radius of 0.250 inches (6.35 mm). Aperture 266 is located a distance 280 from a side surface 282. Preferably distance 280 is equal to 0.834 inches (21.18 mm). Two inner surfaces 284 and 286 of pin holder 116 are separated from side surface 282 by respective distances 290 and 292. Preferably, distances 290 and 292 are equal to 1.022 inches (25.96 mm) and 1.728 inches (43.89 mm), respectively. Thus, the distance between inner surfaces 284 and 286 is equal to 0.706 inches (17.93 mm). The center of aperture 268 is located a distance 294 from side surface 282, which is preferably equal to 1.916 inches (48.67 mm).

Figure 9:
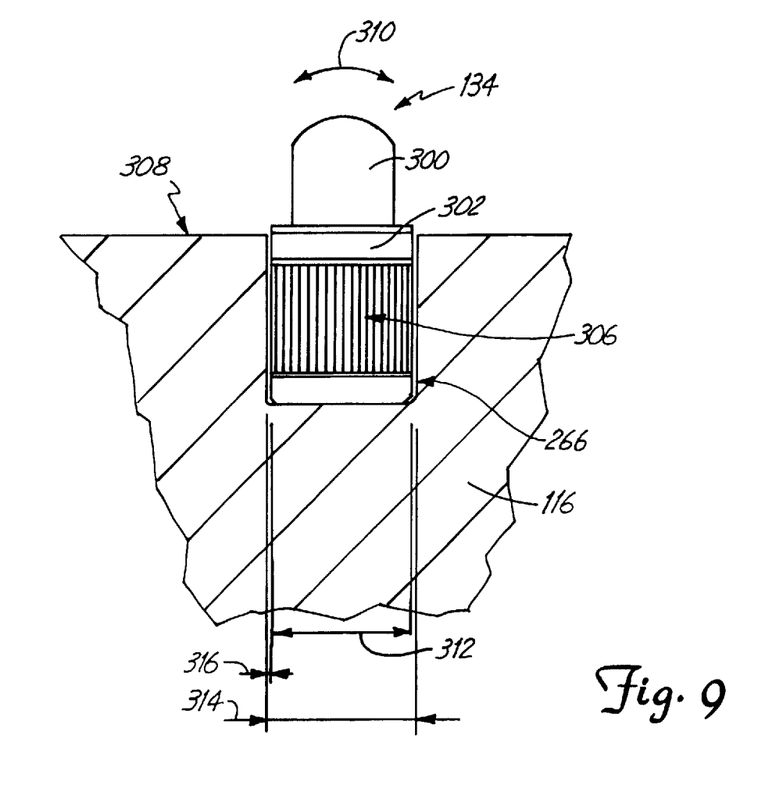
FIG. 9 is a partial cross-section of the pin holder of FIG. 7 showing a locating pin in an aperture.

FIG. 9 is a cross-section of a portion of pin holder 116 showing locating pin 134 in aperture 266. Locating pin 134 has pin 300 which i, partially located within a housing 302. Housing 302 includes a ridge exterior surface 306. The bottom of housing 302 is in contact with the bottom of aperture 266. Within housing 306 is a resilient member, that connects pin 300 to housing member 306 and allows the pin 300 to pivot in directions 310.

Housing 306 has an outer diameter 312 that is less than the inner diameter 314 of aperture 266. The difference in diameters creates an annular gap between aperture 266 and housing 306 that has a distance 316. Specifically, diameter 314 is 0.250 inches (6.35 mm) and diameter 312 is equal to 0.245 inches (6.10 mm), making annular gap 316 equal to 0.0025 inches (0.0635 mm).

Because diameter 312 is less than diameter 314, locating pin 134 is said to be slip fit into aperture 266. Since neither housing 306 nor aperture 266 is deformed by inserting locating pin 134 in aperture 266, it is clear to those skilled in the art that annular gap 316 permits locating pin 134 to be removed from aperture 266 simply by grasping pin 300 and withdrawing housing 306 from aperture 266 in a direction away from a surface 308 of pin holder 116.

Figure 10:
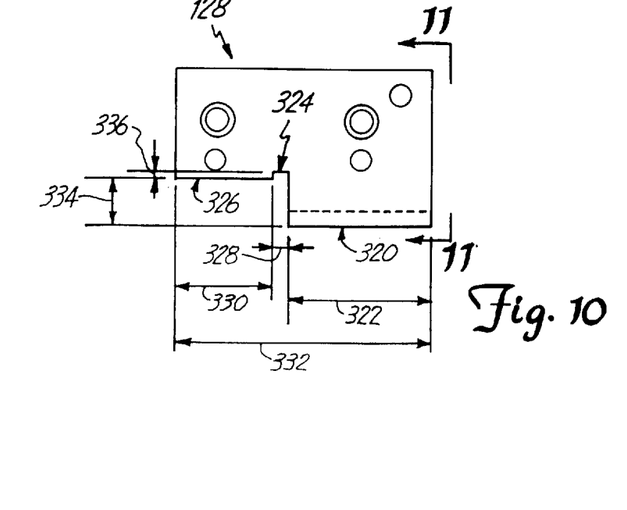
FIG. 10 is a top view of the back assembly of FIG. 4.

FIG. 10 is a top view of back assembly 128 of FIG. 4. Back assembly 128 has contact area 320 first recess area 324, and second recess area 326, which have respective widths 322, 328, and 330. Together, widths 322, 328 and 330 equal the total width 332 of back assembly 128 and preferably have respective values of 1.376 inches (34.95 mm), 0.152 inches (3.86 mm) and 0.91 inches (23.11 mm). Recess area 326 is recessed a distance 334 from contact area 320 and recess area 324 is recessed a distance 336 from recess area 326. Preferably, distance 334 is 0.4345 inches (11.04 mm) and distance 336 is 0.063 inches (1.60 mm).

Figure 11:
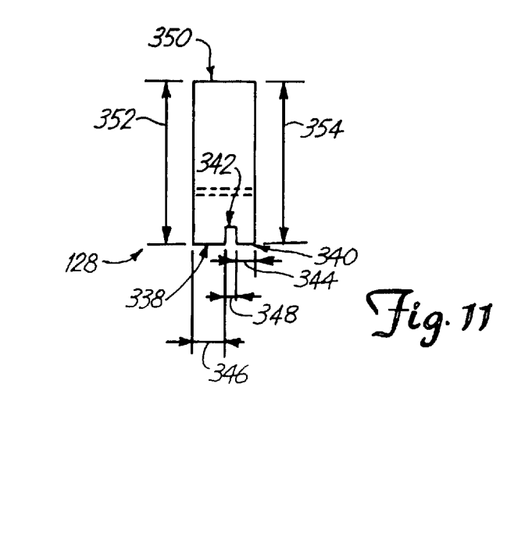
FIG. 11 is a side view of the back assembly of FIG. 10.

As shown in FIG. 11, which is a side view taken along lines 11 of FIG. 10, contact area 320 is constructed of two contact surfaces 338 and 340 and a recess 342. Contact surface 348 abuts the top surface of back assembly 128 and back surface 340 abuts the bottom surface of back assembly 128. Recess 342 is positioned between contact surface 338 and contact surface 340. Contact surfaces 340 and 338 have heights 344 and 346, respectively, and recess 342 has a height 348. Preferably, heights 344, 346 and 348 have respective values of 0.218 inches (5.54 mm), 0.312 inches (7.92 mm), and 0.095 inches (2.41 mm). Contact area 338 is a distance 352 forward from a back surface 350 of back assembly 128, and contact surface 340 is a distance 354 forward from back surface 350. Preferably distance 352 is equal to 1.490 inches (37.846 mm) and distance 354 is equal to 1.495 inches (37.973 mm), so that the two surfaces are offset from each other.

In bonding station 100, contact surface 340 makes contact with magnet 138 and contact surface 338 makes contact with backiron 136. The difference between distance 352 and distance 354 results in a 0.005 inch (0.127 mm) offset between the magnet and the backiron.

Figure 12:
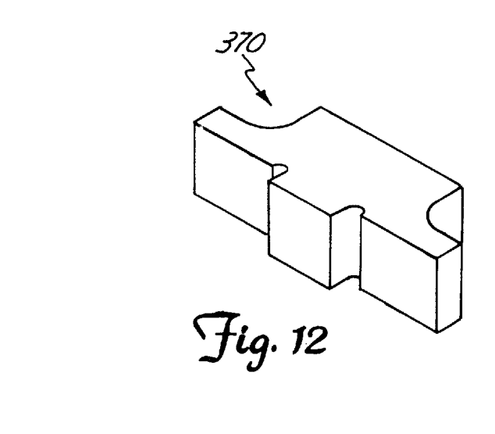
FIG. 12 is a perspective view of a calibration tool for calibrating a bonding station of a preferred embodiment of the present invention.
Figure 13:
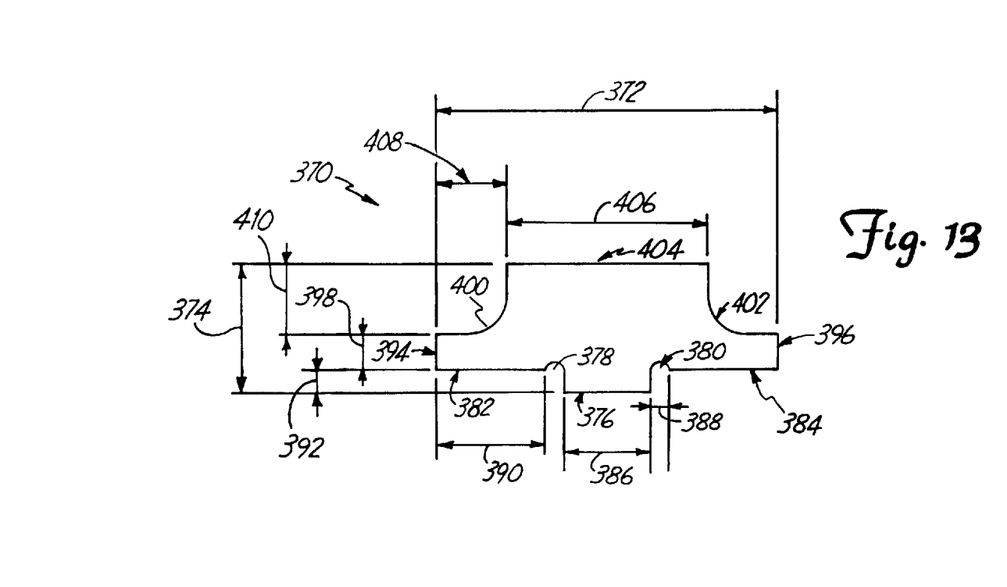
FIG. 13 is a top view of calibration tool of FIG. 12.

FIG. 12 shows a perspective view of a calibration tool 370 for calibrating bonding station 100 of FIG. 4. FIG. 13 shows a top view of calibration tool 370 which has a width 372 and a depth 374. Width 372 is preferably 2.34 inches (59.436 mm) and depth 374 is preferably 0.91 inches (23.114 mm). Calibration tool 370 has a centrally located extending portion 376 flanked by two respective recesses 378 and 380 and two respective flat surfaces 382 and 384. Extending portion 376 has a width 386 centered about a central axis of calibration tool 370 and having a preferred value of 0.60 inches (15.24 mm). Recess areas 378 and 380 each have a recess width 388, which is preferably equal to 0.13 inches (3.12 mm). Flat surfaces 382 and 384 each have a width 390 that is preferably equal to 0.74 inches (18.796 mm).

Extending portion 376 is a distance 392 forward from flat surfaces 382 and 384. Preferably, distance 392 has a value of 0.156 inches (3.962 mm), and is critical to proper calibration of the bonding station. 20 Flat surfaces 382 and 384 abut side surfaces 394 and 396 respectively. Preferably, side surfaces 394 and 396 are at right angles to flat surfaces 382 and 384, and have a depth 398 that is equal to 0.254 inches (6.452 mm). Two curve surfaces 400 and 402 abut side 25 surfaces 394 and 396 and connect the side surfaces to a back surface 404. Back surface 404 has a width 406 that is centered about a central axis of calibration tool 370 and is preferably 1.38 inches (35.052 mm). Side surfaces 394 and 396 are separated from back surface 404 30 by a lateral distance 408 and by a depth distance 410.

Preferably, lateral distance 408 is 0.48 inches (12.192 mm) and depth distance 410 is 0.5 inches (12.7 mm).

Figure 14:
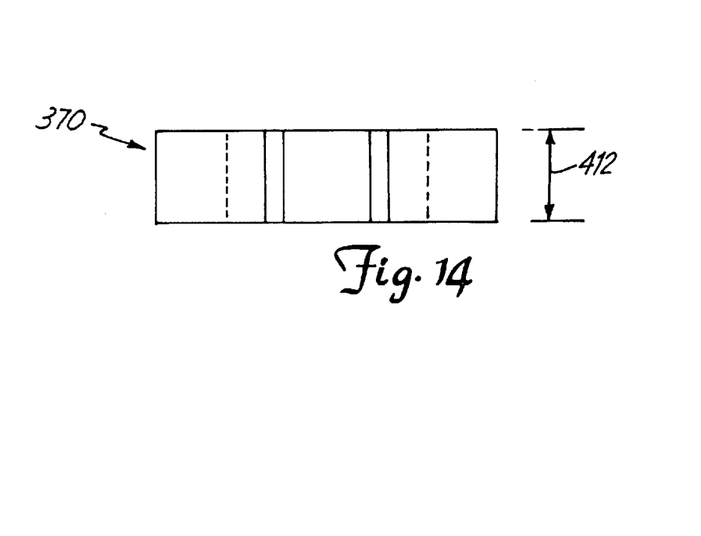
FIG. 14 is a side view of calibration tool 370 of FIG. 12.

FIG. 14 is a side view of calibration tool 370 of FIGS. 12 and 13. FIG. 14 shows that calibration tool 370 has a height 412 of preferably 0.63 inches (16.002 mm).

Figure 15:
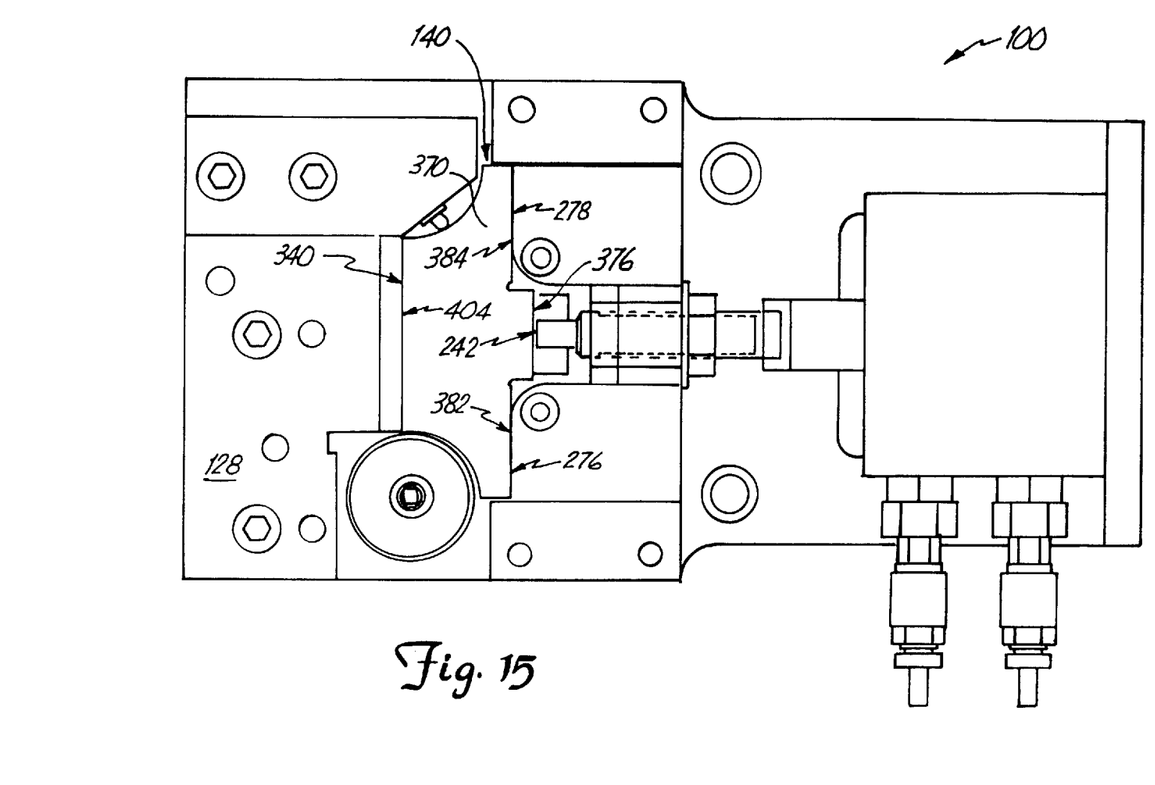
FIG. 15 is a top view of a bonding station with a calibration tool positioned in a nest.

FIG. 15 shows a top view of bonding station 100 with calibration tool 370 located in nest 140. Front surface 376 of calibration tool 370 makes contact with nylon pusher 242. Flat surfaces 382 and 384 of calibration tool 370 contact leading surfaces 276 and 278 of pin holder 116. Back surface 404 of calibration tool 370 contacts surface 340 of back assembly 128.

During calibration of the bonding station, calibration tool 370 may either be located in nest 140 as shown in FIG. 15 or may be held against pin holder 116 by hand. The bonding station is calibrated when the end of nylon pusher 242 is a proper distance from locating pins 132 and 134. Since apertures 266 and 268 are precisely positioned relative to leading edges 278 and 276, the calibration can be accomplished by verifying the distance between the end of nylon pusher 242 and leading edges 278 and 276. When the end of nylon pusher 242 is the proper distance from leading edges 278 and 276, the bonding station is properly calibrated.

Figure 16:
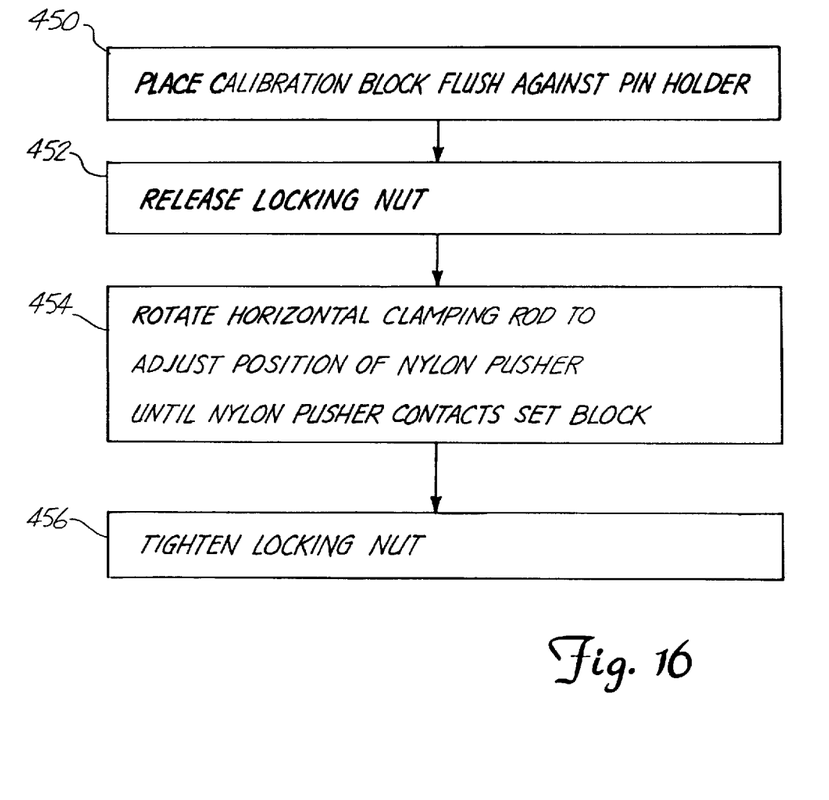
FIG. 16 is a flow diagram for calibrating a bonding station.

FIG. 16 is a flow diagram of a method for calibrating bonding station 100 using calibration block 370 of FIG. 12. In step 450, calibration block 370 is placed flush against leading edges 278 and 276 of pin holder 116. Locking nut 130 is then released in step 452 and horizontal clamping rod 120 is rotated within jam nut 244 in step 454. This rotation changes the position of nylon pusher 242 relative to extending portion 376 of calibration block 370. Once nylon pusher 242 makes contact with extending portion 376, locking nut 130 is re-tightened in step 456.

Figure 17:
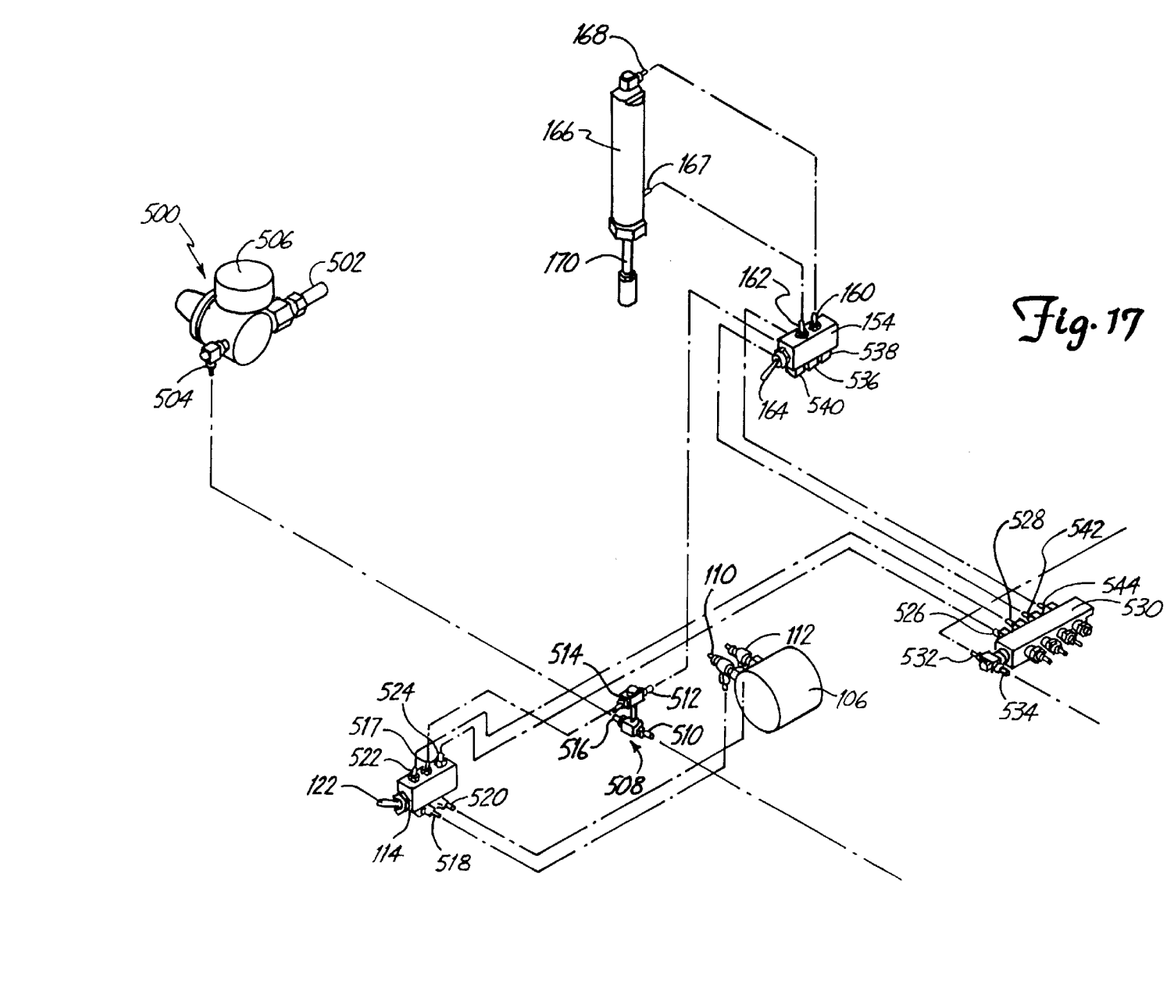
FIG. 17 is a plan view of a pneumatic system used in a bonding station.

FIG. 17 is a plan diagram for a pneumatic system useful in the bonding station of the present invention. A pressure regulator 500 receives a pressurized fluid, preferably air, at an input port 502, and produces a regulated pressure at an output port 504. Preferably, regulator 500 includes a display 506, which displays the regulated pressure at output port 504.

A distributor 508 has an input port 516 that is connected to output port 504 by a fluid connection line. Distributor 508 also includes three output ports 510, 512 and 514. Output port 510 distributes pressurized fluid from regulator 500 to additional bonding stations. Output port 514 provides pressurized fluid to input port 517 of toggle valve 114. Depending on the state of toggle switch 122, toggle valve 114 provides the pressurized fluid at input port 517 to either output port 520 or output port 518. Output ports 520 and 518 are respectively connected to input ports 112 and 110 of horizontal clamp cylinder 106, and thus provide pressurized fluid to actuate horizontal clamp cylinder 106.

Toggle valve 114 also includes two exhaust ports 522 and 524 that provide connections to ports 526 and 528, respectively, of an exhaust manifold 530. Output ports 522 and 524 provide a pathway for air to exit horizontal clamp cylinder 106 through port 110 or port 112 so that pressure received on either port 110 or 112 can move horizontal clamp cylinder 106. Exhaust manifold 530 includes an exhaust-air port 532 that is connected to an exhaust-air source. Output port 534 of exhaust manifold 530 is connected to further exhaust manifolds for further bonding stations if desired.

Output port 512 of distributor 508 provides regulated pressure from pressure regulator 500 to input port 536 of vertical toggle valve 154. Vertical toggle 154 has two output ports 160 and 162 that are fluidly connected to be two input ports 168, 167 of vertical clamp cylinder 166. Depending on the state of toggle switch 164, toggle valve 154 provides the regulated pressure from pressure regulator 500 to either input port 168 or input port 167 of vertical clamp cylinder 166 and thereby moves vertical rod 170. Toggle valve 154 also has exhaust ports 538 and 540 that are connected to input ports 542 and 544 of exhaust manifold 530.

In summary, a calibration tool 370 for calibrating a bonding station 100 includes a first surface 382, 384 for contacting a fixed surface 276, 278 of a movable front assembly 116, and a calibration surface 376 for contacting an adjustable surface 240 of movable front assembly 116. In preferred embodiments, calibration tool 370 is shaped to fit in a nest 140 of bonding station 100.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the bonding station while maintaining substantially the same functionality without departing from the scope and spirit of the present invention. In addition, although the preferred embodiment described herein is directed to a bonding station for bonding a magnet to a backiron, it will be appreciated by those skilled in the art that the teachings of the present invention can be applied to other bonding systems for bonding other materials together, without departing from the scope and spirit of the present invention.

What is claimed is:

1. A calibration tool for calibrating a bonding station configured for bonding a magnet to a backiron, the bonding station having an actuator housing coupled to and capable of moving a movable front assembly, the movable front assembly having a fixed surfacetand an adjustable surface, the position of the adjustable surface adapted to be changed relative to the fixed surface, the calibration tool comprising:

a first surface for contacting the fixed surface of the movable front assembly during calibration; and a calibration surface positioned relative to the first surface such that the movable front assembly is calibrated when the adjustable surface is in contact with the calibration surface while the first surface is in contact with the fixed surface.

2. The calibration tool of claim 1 wherein the movable assembly has a second fixed surface and the calibration tool further comprises a second surface in contact with the second fixed surface during calibration.

3. The calibration tool of claim 1 wherein the bonding station has a nest and the calibration tool is shaped to fit in the nest during calibration.

4. A method for calibrating a bonding station having an actuator housing coupled to a movable assembly that has a fixed surface and an adjustable surface, the method comprising steps of:

(a) placing a first surface of a calibration block in contact with the fixed surface of the movable assembly; and (b) adjusting the position of the adjustable surface so that the adjustable surface contacts a second surface of the calibration block.

5. The method of claim 4 wherein the adjusting step comprises:

(b) (i) loosening a locking nut;

(b) (ii) rotating a thread rod connected to the adjustable surface; and (b) (iii) tightening the locking nut when the adjustable surface is positioned properly.

6. The method of claim 4 wherein the placing step comprises:

(a) (i) placing the calibration block in a nest of the bonding station; and (a) (ii) moving the movable assembly toward the nest until the calibration block is contact with the movable assembly and a back assembly.

7. A calibration tool for calibrating a bonding station having an actuator coupled to a movable assembly that has a fixed surface and an adjustable surface, the calibration tool comprising:

a surface for contacting the fixed surface of the movable assembly; and calibration means for providing a calibration position indicative of a calibrated position for the adjustable surface.

* * * * *

UNITED STATES PATENT AND TRADEMARK OFFICE
CERTIFICATE OF CORRECTION

PATENT NO.   : 5,877,404
DATED        : March 2, 1999
INVENTOR(S)  : Terry R. Fahley It is certified that error appears in the above-identified patent and that said Letters Patent is hereby corrected as shown below:

Col. 9, line 51, change "surfacetand" to --surface and--.

Signed and Sealed this

Twenty-seventh Day of July, 1999

Attest:

Q. TODD DICKINSON

*Attesting Officer*    Acting Commissioner of Patents and Trademarks